United States Patent Office 3,506,581
Patented Apr. 14, 1970

3,506,581
CORROSION INHIBITOR FOR AQUEOUS ACID
Clare H. Kucera, Tulsa, Okla., assignor to The Dow Chemical Company, Midland, Mich., a corporation of Delaware
No Drawing. Filed Feb. 21, 1964, Ser. No. 346,396
Int. Cl. C23g 1/06; C23f 11/04
U.S. Cl. 252—146
3 Claims

ABSTRACT OF THE DISCLOSURE

Liquid hydrocarbons are employed in conjunction with acetylenic alcohol corrosion inhibitors to enhance the effectiveness of said inhibitors for inhibiting corrosive action of aqueous non-oxidizing acids such as hydrochloric on metal surfaces.

This invention relates to new corrosion inhibitors for use in protecting metals from attack by aqueous non-oxidizing acids.

It is well known that acetylenic alcohols are effective corrosion inhibitors (U.S. Patents 2,913,408; 2,993,862-3-4-5; and 3,049,496 and Italian 468,231).

It has now been discovered that the effectiveness of acetylenic alcohols is greatly and unexpectedly increased by their use in combination with a liquid hydrocarbon material.

The preferred acetylenic alcohols for use in the present invention are the alkynols, particularly the 1-alkyn-3-ols having from 3 to 10 carbon atoms.

A great variety of hydrocarbons can be used in the invention to increase the effffectiveness of the acetylenic alcohol inhibitors. Thus, the liquid aliphatic, cycloaliphatic and aromatic hydrocarbons having from 5 to 20 or more carbon atoms are useful. These include the alkanes, such as pentane, octane, dodecane, hexadecane, octadecane and eicosane; the alkenes, such as pentene, decene, tetradecene, octadecadiene and eicosatetraene; the alkynes, such as pentyne, octyne, dodecyne, hexadecadiyne and the like, including the various isomers of the above hydrocarbons, and mixtures thereof, such as petroleum naphtha, gasoline, kerosene, diesel oil, and lube oils; the cycloaliphatic hydrocarbons, such as cyclohexane, cyclohexene, cyclopentadiene, menthane, camphene and pinene, as well as mixtures and natural products such as turpentine, rosin oil, pine oil and the like; and the monocyclic aromatic hydrocarbons, such as benzene, toluene, xylene, butylbenzene, dodecyltoluene, diamylbenzene, cumene, cymene, and the like.

The proportions of hydrocarbon and alkynol in the inhibitors can be varied widely within the scope of the invention. As little as 25%, or even 10% of hydrocarbon, by weight, based on the alkynol, produces some improvement in corrosion inhibition, though it is preferred to use 100% or more. There is no critical maximum proportion of hydrocarbon that can be used, though amounts in excess of about 10 times by weight of the amount of alkynol ordinarily do not give any significant additional benefit.

The amount of the inhibitor composition to be used in aqueous acid compositions varies widely, depending on the concentration of acid, temperature, type of metal to be protected and duration of exposure. Very low concentrations, of the order of a few hundredths of one percent by weight, of alkynol in the aqueous acid is often adequate when the acid is dilute, the temperature is low, and/or the metal is fairly resistant to attack. On the other hand, in stronger acid, at elevated temperatures and/or when the metal is highly susceptible to corrosion, it is sometimes advantageous to use as much as 1 to 2%, by weight, of alkynol in the acid. These percentages are based on alkynol because this apparently is the active inhibitor, being active even in the absence of the hydrocarbon. On the other hand, the hydrocarbon component of the inhibitor composition of the invention is essentially ineffective when used alone.

The inhibitors of the invention are useful in any aqueous non-oxidizing acid, this being a well known class of acids which includes hydrochloric, hydrobromic, sulfuric, sulfurous, hydrosulfuric, carbonic, acetic, citric, adipic, oxalic and like acids. Even such acids as nitric, chromic, and hypochlorous acids, which are ordinarily considered to be oxidizing acids, may be inhibited in dilute solutions and at low temperatures.

The metals to be protected are generally the common ferrous structural metals, such as the common varieties of iron and steel, though other metals, such as aluminum, brass, copper, solder, and the like may also be significantly protected.

In practicing the invention, it is frequently convenient to prepare the inhibitor as a concentrate consisting essentially of one or more alkynols and one or more hydrocarbons, though other conventional inhibitors may also be present. This concentrate can be handled, stored, and sold as such and then can be added to the aqueous acid as needed. Alternatively, the inhibitor components can be added separately or together to the concentrated acid and this inhibited acid can then be diluted as needed for use. Such a concentrate, of course, will ordinarily have higher concentrations of inhibitor than those set forth hereinbefore, so as to assure that the acid after dilution to the concentration to be used will contain an adequate concentration.

Particular industrial applications for inhibited aqueous acids include oil well acidizing and the pickling and descaling of metals.

In evaluating the inhibitors of the invention, several series of tests were made as reported hereinafter. In each series, metal coupons of uniform size and shape were immersed in a fixed volume of aqueous acid (15% aqueous HCl unless otherwise specified) and maintained at a constant temperature for 16 hours. The loss in weight of the coupon was then used to calculate the corrosion rate in pounds of metal dissolved per square foot of exposed surface per day of exposure to the acid. Results of such tests are shown in the following tables. Data are shown for two common types of steel; AISI–1010 and N–80.

Table I shows corrosion rates of AISI–1010 steel in 15% hydrochloric acid at 200° F., the acid containing 0.2% of propynol and the indicated amount of a hydrocarbon, as weight percents, based on the aqueous acid.

TABLE I.—CORROSION INHIBITION BY PROPYNOL WITH HYDROCARBONS

| Example | Hydrocarbon, percent | Corrosion rate, lb./ft.²/day |
|---|---|---|
| 1 | Pentane, 0.2 | 0.028 |
| 2 | Hexane, .2 | .022 |
| 3 | Heptane, .2 | .014 |
| 4 | Decane, .2 | .036 |
| 5 | Pentene, .2 | .022 |
| 6 | Hexene, .2 | .016 |
| 7 | Heptene, .2 | .014 |
| 8 | Decene, .2 | .025 |
| 9 | Pentyne, 1.0 | .01 |
| 10 | Hexyne, 1.0 | .003 |
| 11 | Heptyne, 1.0 | .0015 |
| 12 | Decyne, 1.0 | .004 |
| 13 | None | >1 |

Table II shows data similar to that in Table I except that the alkynol was 1-hexyn-3-ol.

TABLE II.—CORROSION INHIBITION BY HEXYNOL WITH VARIOUS HYDROCARBONS

| Example | Hydrocarbon, percent | Corrosion rate, lb./ft.²/day |
|---|---|---|
| 14 | Hexane, 0.2 | 0.0016 |
| 15 | Heptane, .2 | .0030 |
| 16 | Pentene, .2 | .002 |
| 17 | Heptene, .2 | .002 |
| 18 | Decene, .2 | .0015 |
| 19 | Pentyne, 1.0 | .001 |
| 20 | Hexyne, 1.0 | .001 |
| 21 | Heptyne, 1.0 | .0006 |
| 22 | Decyne, 1.0 | .0005 |
| 23 | Kerosine, .8 | .003 |
| 24 | None | .009 |

Table III shows results of tests similar to those above except that N-80 steel was used instead of 1010. Percentages are by weight, based on the aqueous 15% HCl.

TABLE III.—CORROSION INHIBITION BY ALKYNOLS WITH KEROSINE

| Example | 1-alkyn-3-ol, percent | Percent kerosine | Corrosion rate, lb./ft.²/day |
|---|---|---|---|
| 25 | Pentynol, 0.4 | 0 | >1 |
| 26 | do | 1 | 0.005 |
| 27 | Hexynol, .4 | 0 | .2 |
| 28 | do | 1 | .002 |
| 29 | Hexynol, .2 | 1 | .006 |
| 30 | Heptynol, .4 | 0 | .003 |
| 31 | do | 1 | .001 |
| 32 | Heptynol, .2 | 0 | .010 |
| 33 | do | 1 | .005 |

Tests similar to those in the above examples wherein 1-hexyn-3-ol was used in combination with various hydrocarbons, at various temperatures, in different concentrations of hydrochloric acid and with two kinds of steel are shown in Table IV.

TABLE IV

| Example | Hexynol, percent | Hydrocarbon, percent | Hydrochloric acid Percent | Hydrochloric acid Temp. (° F.) | Steel | Corrosion rate, lb./ft.²/day |
|---|---|---|---|---|---|---|
| 34 | 0.2 | Spindle oil, 0.8 | 15 | 200 | N-80 | 0.0052 |
| 35 | 0.2 | Diesel oil, 0.8 | 15 | 200 | N-80 | .0055 |
| 36 | 0.2 | Xylene, 0.8 | 15 | 200 | N-80 | .0045 |
| 37 | 0.2 | Rosin oil,[1] 0.8 | 15 | 200 | N-80 | .0048 |
| 38 | 0.4 | None | 15 | 250 | N-80 | [2] 0.107 |
| 38a | 0.2 | do | 15 | 250 | N-80 | 0.235 |
| 39 | 0.2 | Kerosine, 0.8 | 15 | 250 | N-80 | .0250 |
| 40 | 0.4 | Kerosine, 0.6 | 15 | 250 | N-80 | .0060 |
| 41 | 0.5 | Kerosine, 0.5 | 15 | 250 | N-80 | .0030 |
| 42 [2] | 1.0 | Kerosine, 1.0 | 35 | 80 | 1010 | .014 |
| 43 [2] | 1.5 | Kerosine, 1.5 | 35 | 80 | 1010 | .007 |

[1] Crude rosin oil containing a high percentage of terpene hydrocarbons.
[2] Tests were run 6 hours instead of 16 hours.

I claim:
1. Aqueous hydrochloric acid containing, as a corrosion inhibitor therefor, an effective amount of a synergistic mixture of (1) an alkynol of 3 to 10 carbon atoms and (2) a hydrocarbon of 5 to 20 carbon atoms.
2. The acid of claim 1 wherein the concentration of alkynol is 0.1 to 2% by weight.
3. Aqueous hydrochloric acid containing, as a corrosion inhibitor therefor, an effective amount of a synergistic mixture of one part by weight of hexynol and 1 to 10 parts of kerosine.

References Cited

UNITED STATES PATENTS

| 856,644 | 6/1907 | Laverty | 252—146 |
| 2,640,765 | 6/1953 | Easley et al. | 252—79.4 |
| 2,846,294 | 8/1958 | Patterson et al. | 252—146 |
| 3,079,345 | 2/1963 | Monroe et al. | 252—146 |
| 3,231,507 | 1/1966 | Beale et al. | 252—146 |

FOREIGN PATENTS 468,231  12/1951  Italy.

OTHER REFERENCES

Foster et al.: Acetylenic Corrosion Inhibitors, article in Industrial and Engineering Chemistry, vol. 51, No. 7, July 1959.

HERBERT B. GUYNN, Primary Examiner

U.S. Cl. X.R.

252—8.55, 396